United States Patent [19]

Okano et al.

[11] Patent Number: 5,182,459
[45] Date of Patent: Jan. 26, 1993

[54] CONTROL SYSTEM FOR VEHICLE SAFETY DEVICE

[75] Inventors: Masami Okano; Kunihiro Takeuchi, both of Higashimatsuyama, Japan

[73] Assignee: Zexel Corporation, Tokyo, Japan

[21] Appl. No.: 642,951

[22] Filed: Jan. 18, 1991

[30] Foreign Application Priority Data

Feb. 7, 1990 [JP] Japan .................. 2-25942

[51] Int. Cl.$^5$ ...................... B60R 21/32; B60R 21/00
[52] U.S. Cl. .................... 307/10.1; 280/735; 340/438; 364/424.05
[58] Field of Search ........ 307/10.1, 121, 360, 307/236; 340/436–438; 180/274, 281, 282, 286; 280/735; 324/502, 537; 364/424.05

[56] References Cited

U.S. PATENT DOCUMENTS

| | | | |
|---|---|---|---|
| 4,836,024 | 6/1989 | Woehrl et al. | 307/10.1 |
| 4,845,377 | 7/1989 | Swart | 307/10.1 |
| 4,853,623 | 8/1989 | Sterler et al. | 280/735 X |
| 4,873,452 | 10/1989 | Morota et al. | 307/10.1 |
| 4,950,914 | 8/1990 | Kurihara et al. | 307/10.1 |
| 4,985,835 | 1/1991 | Sterler et al. | 280/735 X |
| 5,038,134 | 8/1991 | Kondo et al. | 280/735 X |

FOREIGN PATENT DOCUMENTS

63-241467 10/1988 Japan .
2 5371 1/1990 Japan .

Primary Examiner—A. D. Pellinen
Assistant Examiner—Fritz M. Fleming

[57] ABSTRACT

A control system for a vehicle safety device includes an acceleration sensing circuit, an analog collision detection system, a digital collision detection system, and a drive circuit which operates the vehicle safety device when the drive circuit simultaneously receives collision detection signals respectively from both of the analog and digital collision detection systems. A microcomputer of the digital collision detection system outputs test pulses to the acceleration sensing circuit, and checks at least one of the output of an integrating circuit of the analog collision detection system and an output of a comparator circuit of the analog collision detection system so as to detect a malfunction of the analog collision detection system, the outputs of the integrating circuit and the comparator circuit being produced in response to the test pulse.

8 Claims, 5 Drawing Sheets

CONTROL SYSTEM FOR VEHICLE SAFETY DEVICE

BACKGROUND OF THE INVENTION

This invention relates to a system for controlling a vehicle safety device, such as an air bag.

An air bag control system basically comprises an acceleration sensing circuit, a collision detection circuit, and a squib drive circuit. The acceleration sensing circuit produces an output corresponding to an abrupt deceleration occurring upon collision of a vehicle. In the collision detection circuit, the output of the acceleration sensing circuit is integrated, and this integral output is compared with a threshold level. When the integral output exceeds the threshold level, a collision detection signal is outputted from the collision detection circuit. The squib drive circuit is responsive to this collision detection signal to ignite a squib so as to expand an air bag.

Conventional collision detection circuits are classified into the digital-type and the analog-type. Such a digital collision detection system provided with a microcomputer is advantageous in that it can detect collision with high precision; however, when the microcomputer runs away, a collision detection signal may be outputted even when no collision occurs, so that the squib is erroneously ignited to expand the air bag. Although the analog collision detection system does not suffer from the problem of a run-away of the microcomputer, it can not effect a high-precision collision detection.

Under the circumstances, there has been proposed an air bag control system, as disclosed in Japanese Laid-Open (Kokai) Utility Model Application No. 5371/90, which is provided with both an analog collision detection system and a digital collision detection system. A squib drive circuit of this control system ignites a squib only when the squib drive circuit simultaneously receives collision detection signals respectively from the analog and digital collision detection systems. Therefore, the ignition of the squib based on a high-precision collision detection by a microcomputer can be effected, and besides an accidental ignition of the squib due to a run-away of the microcomputer can be prevented.

In the above control system, however, a malfunction of the analog collision detection system is not detected, and there are occasions when the control system is operated with such a malfunction being present. In this case, the accidental ignition of the squib due to the run-away of the microcomputer can not be prevented by the analog collision detection system, and also in the event of the vehicle collision, the squib will fail to be ignited.

Japanese Laid-Open Patent Application No. 241467/88 (corresponding to U.S. Pat. No. 4,950,914) discloses an air bag control system which comprises a malfunction detection circuit in addition to a piezoelectric element serving as an acceleration sensor, an analog collision detection system and a squib drive circuit. The malfunction detection circuit supplies test pulses to the piezoelectric element. The piezoelectric element, when receiving the test pulse at a pair of electrodes thereof, is strained, and outputs a voltage, corresponding to this strain, from another pair of electrodes thereof. The output of the piezoelectric element produced in response to the test pulse is integrated by an integrating circuit of the analog collision detection system, and this integral output is compared with a threshold level in a comparator circuit of the analog collision detection system, and a high-level signal is outputted from the comparator circuit in a manner similar to that of the collision detection. The high-level signal of the comparator circuit is supplied to a transistor of the squib drive circuit to turn on this transistor. As a result, the voltage at one terminal of the squib increases from the ground potential to a battery voltage. The above malfunction detection circuit, when detecting this voltage increase, judges that the acceleration sensor and the analog collision detection system are normal, and the malfunction detection circuit, when not detecting the voltage increase, judges that either the acceleration sensor or the analog collision detection system is abnormal, and turns on an alarm lamp.

In the control system of the above Japanese Laid-Open Patent Application No. 241467/88, however, the malfunction detection circuit is used only to detect a malfunction of the acceleration sensor and the analog collision detection system. Further, this control system is not provided with a digital collision detection system.

SUMMARY OF THE INVENTION

It is an object of this invention to provide a control system for a vehicle safety device in which there are provided both a digital collision detection system and an analog collision detection system, and a malfunction of the analog collision detection system can be detected by a microcomputer of the digital collision detection system.

According to the present invention, there is provided a control system for a vehicle safety device comprising:
(a) an acceleration sensing circuit;
(b) an analog collision detection system including an integrating circuit for integrating an output of the acceleration sensing circuit, and a comparator circuit for comparing an output of the integrating circuit with a threshold level so as to detect a collision of a vehicle;
(c) a digital collision detection system including an analog-to-digital converter for converting the output of the acceleration sensing circuit into digital data, and a microcomputer, the microcomputer comprising (i) collision detection means for performing calculations in accordance with the digital data from the analog-to-digital converter, so as to detect the vehicle collision; (ii) test pulse generating means for outputting test pulses to the acceleration sensing circuit; and (iii) malfunction detection means for checking at least one of the output of the integrating circuit of the analog collision detection system and an output of the comparator circuit so as to detect a malfunction of the analog collision detection system, the outputs of the integrating circuit and the comparator circuit being produced in response to the test pulse; and
(d) a drive circuit which operates the vehicle safety device when the drive circuit simultaneously receives collision detection signals respectively from both of the analog and digital collision detection systems.

DESCRIPTION OF THE PREFERRED EMBODIMENT OF THE INVENTION

Figure 1:
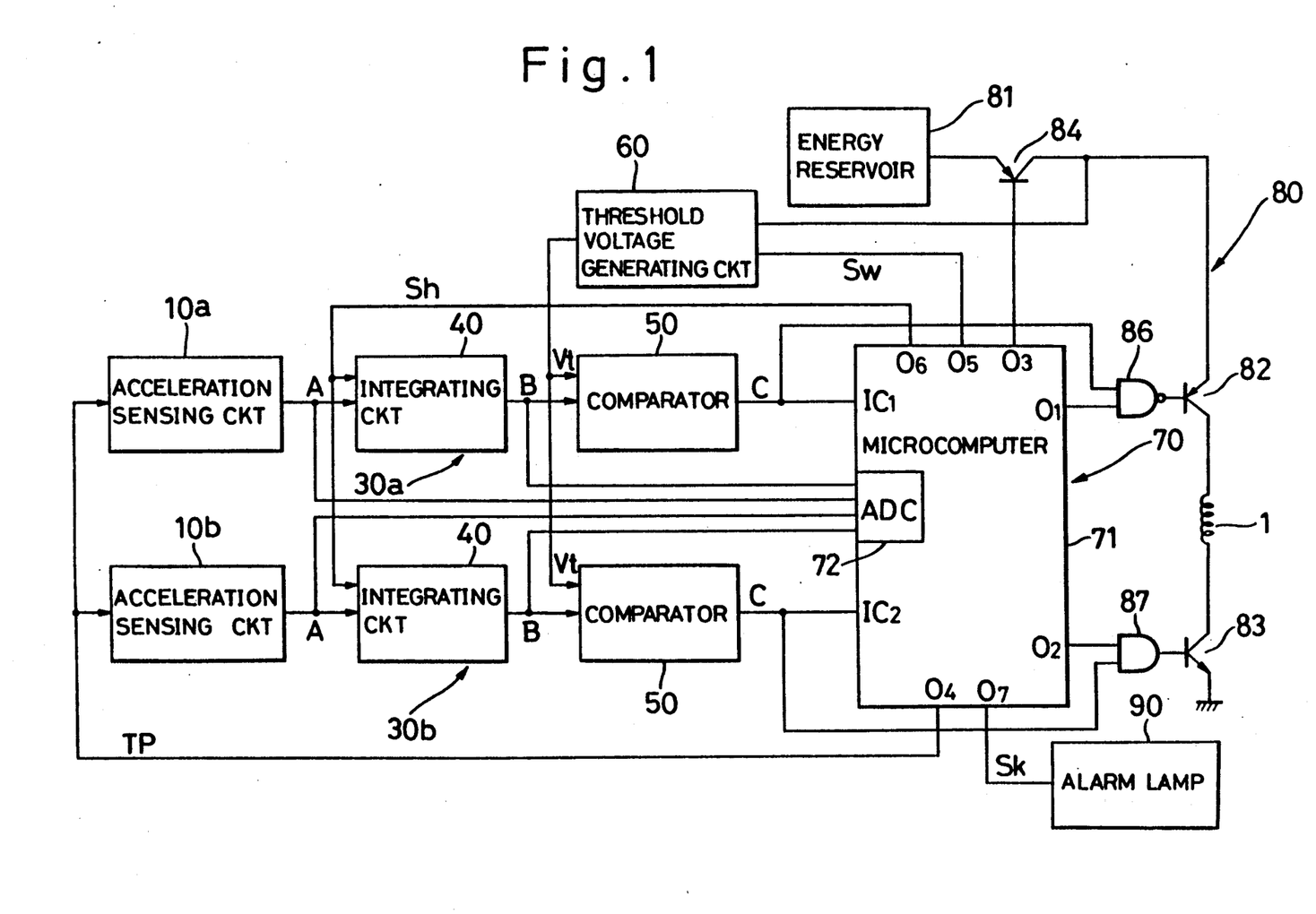
FIG. 1 is a circuit diagram of an air bag control system provided in accordance with the present invention.

One preferred embodiment of the present invention will now be described with reference to FIGS. 1 to 6. FIG. 1 shows the overall construction of a control system for controlling the ignition of a squib 1 of an air bag (vehicle safety device). This control system comprises two acceleration sensing circuits 10a and 10b, two lines of analog collision detection systems 30a and 30b which detect a vehicle collision in accordance with information fed respectively from the two acceleration sensing circuits 10a and 10b, and the digital collision detection system 70. The control system further comprises a drive circuit 80 responsive to collision detection signals from the collision detection systems 30a, 30b and 70 so as to drive the squib 1, and an alarm lamp 90 for indicating a malfunction of the analog collision detection systems 30a and 30b.

Each of the analog collision detection systems 30a and 30b comprises an integrating circuit 40, 40' and a comparator 50, 50'. The two analog collision detection systems 30a and 30b further comprise a common threshold voltage generating circuit 60 for supplying a threshold voltage Vt respectively to the two comparators 50, 50'. The digital collision detection system 70 comprises a microcomputer 71, and an analog-to-digital converter (hereinafter referred to as "ADC") 72 contained in the microcomputer 71. Outputs A, A' of the acceleration sensing circuits 10a and 10b are converted by ADC 72 to a digital form, and are supplied to the microcomputer 71 so as to serve as signals for detecting the collision. Outputs B, B' of the integrating circuits 40, 40' of the analog collision detection systems 30a and 30b are converted by ADC 72 to a digital form, and are supplied to the microcomputer 71 so as to serve as signals for detecting malfunctions of the analog collision, detection systems 30a and 30b, respectively. Outputs C, C' of the comparators 50 and 50' are supplied respectively to input captures $IC_1$ and $IC_2$ of the microcomputer 71 so as to serve as signals for detecting malfunctions of the analog collision detection systems 30a and 30b, respectively.

The microcomputer 71 includes output ports $O_1$, $O_2$ and $O_3$ for outputting the collision detection signal to the drive circuit 80, an output port $O_4$ for outputting test pulses TP to the acceleration sensing circuits 10a and 10b, an output port $O_5$ for outputting a voltage level switch instruction signal Sw to the threshold voltage generating circuit 60, an output port $O_6$ for outputting a discharge instruction signal Sh to the integrating circuits 40 and 40' and an output port $O_7$ for outputting a turn-on instruction signal Sk to the alarm lamp 90.

The squib 1 is incorporated in the drive circuit 80. One terminal of the drive circuit 80 is connected to an energy reservoir 81 in the form of a capacitor of a large capacity, and the other terminal of the drive circuit 80 is grounded. The drive circuits 80 comprises a first transistor 82 of the PNP type and a second transistor 83 of the NPN type which are connected in series with the opposite ends of the squib 1, respectively, and a third transistor 84 of the PNP type connected between the energy reservoir 81 and the first transistor 82.

The drive circuit 80 further comprises NAND circuit 86 and AND circuit 87. The output C of the comparator 50 of the analog collision detection system 30a and the output from the output port $O_1$ of the microcomputer 71 are supplied to two input terminals of the NAND circuit 86, respectively. An output of the NAND circuit 86 is supplied to the base of the first transistor 82. The output C of the comparator 50, 50' of the other analog collision detection system 30b and the output from the output port $O_2$ of the microcomputer 71 are supplied to two input terminals of the AND circuit 87, respectively. An output of the AND circuit 87 is supplied to the base of the second transistor 83. The output from the output port $O_3$ of the microcomputer 71 is supplied to the base of the third transistor 84.

Figure 2:
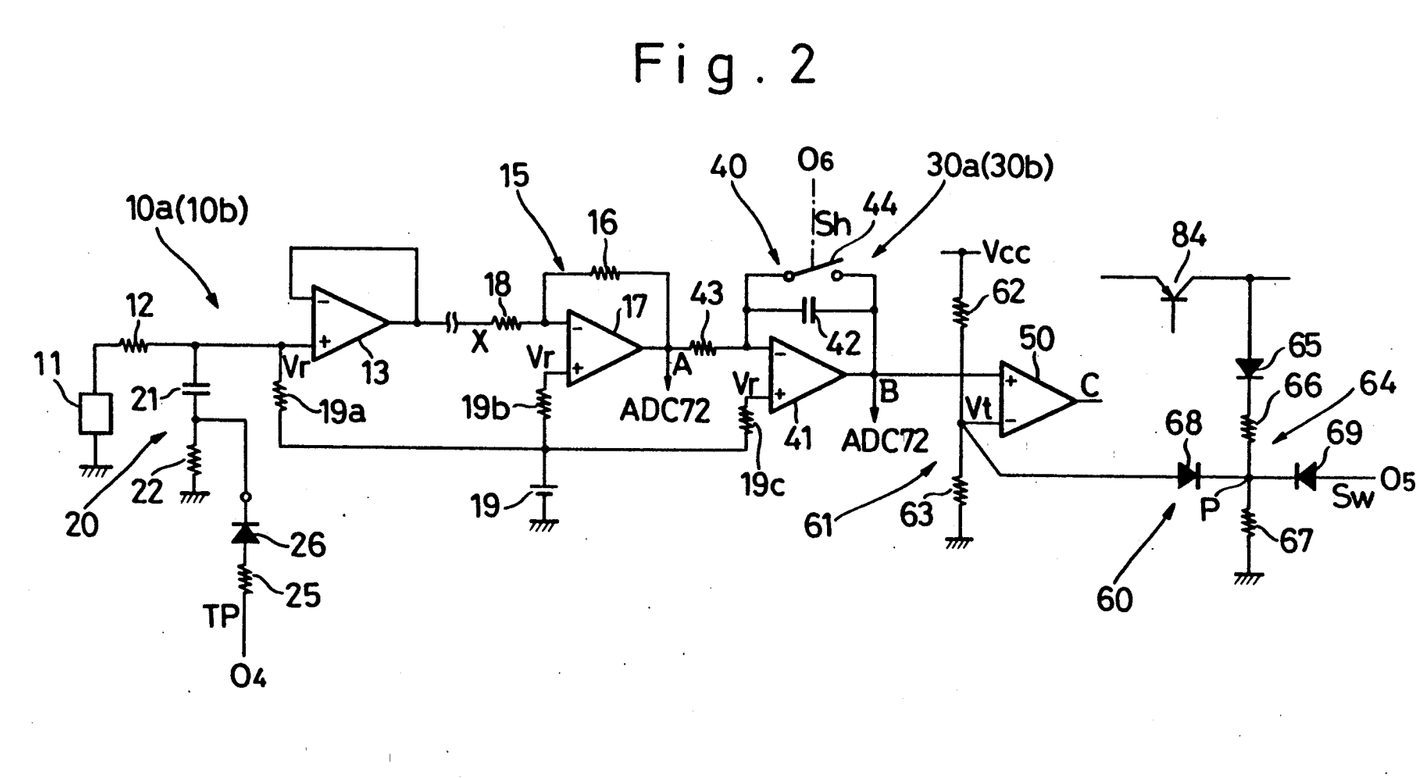
FIG. 2 is a detailed circuit diagram of an acceleration sensing circuit and an analog collision detection system of the control system.

The constructions of the acceleration sensing circuit 10a (10b) and the analog collision detection system 30a (30b) will now be described in detail with reference to FIG. 2. Each of the acceleration sensing circuits 10a and 10b includes a piezoelectric element 11. For example, the piezoelectric element 11 receives a pulling force when the vehicle is accelerated, so as to output a positive voltage. Also, the piezoelectric element 11 receives a compressive force when the vehicle is decelerated, so as to output a negative voltage. The output of the piezoelectric element 11 is supplied to an input terminal of a buffer 13 via a resistor 12. A reference voltage Vr (2.5 V in this embodiment) is also supplied from a reference voltage source 19 to this input terminal of the buffer 13 via a resistor 19a.

Each of the acceleration sensing circuits 10a and 10b further comprises a first-stage inverting amplifier circuit (not shown) and a second-stage inverting amplifier circuit 15. The first-stage inverting amplifier circuit serves to amplify the output of the buffer 13 in an inverting manner, and is generally identical in construction to the second-stage inverting amplifier 15. The second-stage inverting amplifier circuit 15 includes an operational amplifier 17 arranged in a negative feedback manner via a resistor 16, and an output X of the first-stage inverting amplifier circuit is supplied to an inverting input terminal of the operational amplifier 17 via a resistor 18. The reference voltage Vr (2.5 V) is supplied from the reference voltage source 19 to a non-inverting input terminal of the operational amplifier 17 via a resistor 19b.

Each of the acceleration sensing circuits 10a and 10b further comprises test pulse input means 20. The test pulse input means 20 has a capacitor 21. One terminal of the capacitor 21 is connected to the input terminal of the buffer 13, and the other terminal of the capacitor 21 is grounded via a resistor 22. The test pulse TP from the microcomputer 17 is supplied to the junction point between the capacitor 21 and the resistor 22 via a resistor 25 and a diode 26.

The integrating circuit 40, 40' of each of the analog collision detection systems 30a and 30b comprises an operational amplifier 41, a capacitor 42 connected between an output terminal and an inverting input terminal of the operational amplifier 41, an input resistor 43 connected to the inverting input terminal of the operational amplifier 41, and a discharge switch 44 connected in parallel with the capacitor 42. The output A of the inverting amplifier circuit 15 is supplied to the inverting input terminal of the operational amplifier 41 via the resistor 43. The reference voltage Vr (2.5 V) is supplied from the reference voltage source 19 to a non-inverting input terminal of the operational amplifier 41 via a resistor 19c.

The output B of the operational amplifier 41 of the integrating circuit 40 is supplied to a non-inverting input terminal of the comparator 50. The threshold voltage Vt is supplied from the threshold voltage generating circuit 60 to an inverting input terminal of the comparator 50.

The threshold voltage generating circuit 60 comprises a divider circuit 61 which broadly comprises two resistors 62 and 63 serially connected together. One terminal of the divider circuit 61 is connected to a constant voltage source Vcc, and the other terminal thereof is connected to the ground. The voltage at the junction point between the two resistors 61 and 62 is supplied as the threshold voltage Vt.

The threshold voltage generating circuit 60 further comprises level switching means 64 which is responsive to the voltage switch instruction signal Sw from the microcomputer 71 so as to switch the level of the threshold voltage Vt. More specifically, the level switching means 64 comprises a diode 65, resistors 66 and 67, a diode 68 connected between the junction point P between the resistors 66 and 67 and the inverting input terminal of the comparator 50, and a diode 69 connected between the junction point P and the output port $O_5$ of the microcomputer 71. The diode 65 and the resistors 66 and 67 are serially connected in a sequence from the collector of the third transistor 84 of the drive circuit 80 toward the ground. Each of the diodes 65, 68 and 69 has its cathode directed toward the junction point P.

In the above control system, first, the collision detection by the digital collision detection system 70 will now be described. The microcomputer 71 executes a collision detection mode except during a predetermined time period after the power source is turned on. More specifically, the output ports $O_3$ and $O_5$ go to a high level whereas the other output ports $O_1$, $O_2$, $O_4$, $O_6$ and $O_7$ go to a low level. Since the output port $O_3$ is at the high level, the third transistor 84 is in the OFF state, and since the output ports $O_1$ and $O_2$ are at the low level, the first and second transistors 82 and 83 are in the OFF state. As a result, the ignition of the squib 1 is prevented. The outputs A of the inverting amplifier circuits 15 of the acceleration sensing circuits 10a and 10b are inputted to ADC 72 where the outputs A are converted to digital data. The microcomputer 71 performs calculations or processings in accordance with these digital data so as to judge whether or not any vehicle collision has occurred. Basically, the difference between each of the outputs A of the two acceleration sensing circuits 10a and 10b and the reference voltage Vr (2.5 V) is integrated, and each of the two integral values thus obtained is compared with the threshold level. When the two integral values both exceed the threshold level, a low-level collision detection signal is fed to the third transistor 84 to turn on it, and at the same time a high-level collision detection signal is fed to the NAND circuit 86 and the AND circuit 87.

Next, the collision detection by the analog collision detection systems 30a and 30b will now be described. In the collision detection mode, since the output port $O_5$ of the microcomputer 71 is at the high level, the voltage level at the junction point P is higher than a first voltage level (for example, 2.8 V) obtained by dividing the constant voltage Vcc by the divider circuit 61, and the diode 68 is in the OFF state. Therefore, the threshold voltage Vt supplied to the comparators 50, 50' is at the first voltage level (2.8 V).

When the vehicle is stopped or is running at a constant speed, the piezoelectric element 11 does not output the voltage signal, and the output X of the first-stage inverting amplifier circuit (not shown) and the output A of the second-stage inverting amplifier circuit 15 are maintained at the reference voltage Vr (2.5 V). When the vehicle is in a decelerating condition, the piezoelectric element 11 outputs a negative voltage signal, so that the output of the buffer 13 becomes lower than the reference voltage Vr. The output X of the first-stage inverting amplifier circuit is obtained by amplifying the output of the buffer 13 in an inverting manner, and therefore the output X becomes higher than the reference voltage Vr, and the output A of the second-stage inverting amplifier circuit 15 becomes lower than the reference voltage Vr. In contrast, when the vehicle is in an accelerating condition, the output X becomes lower than the reference voltage Vr, and the output A becomes higher than the reference voltage Vr.

As described above, when the vehicle is stopped or is running at a constant speed, the output A, A' of each of the acceleration sensing circuits 10a and 10b is maintained at the reference voltage Vr (2.5 V), and therefore the output B, B' of the integrating circuit 40, 40' is also maintained at the reference voltage Vr. The comparator 50, 50' compares the threshold voltage Vt of the first voltage level (2.8 V)) with the output B (2.5 V) of the integrating circuit 40, 40', and therefore the output C, C' of the comparator 50, 50' goes to the low level. When the vehicle is in an accelerating condition or a decelerating condition during the normal operation of the vehicle, the output B, B' of the integrating circuit 40, 40' is below the threshold voltage Vt, and therefore the output C, C' of the comparator 50, 50' is maintained at the low level.

Figure 3:
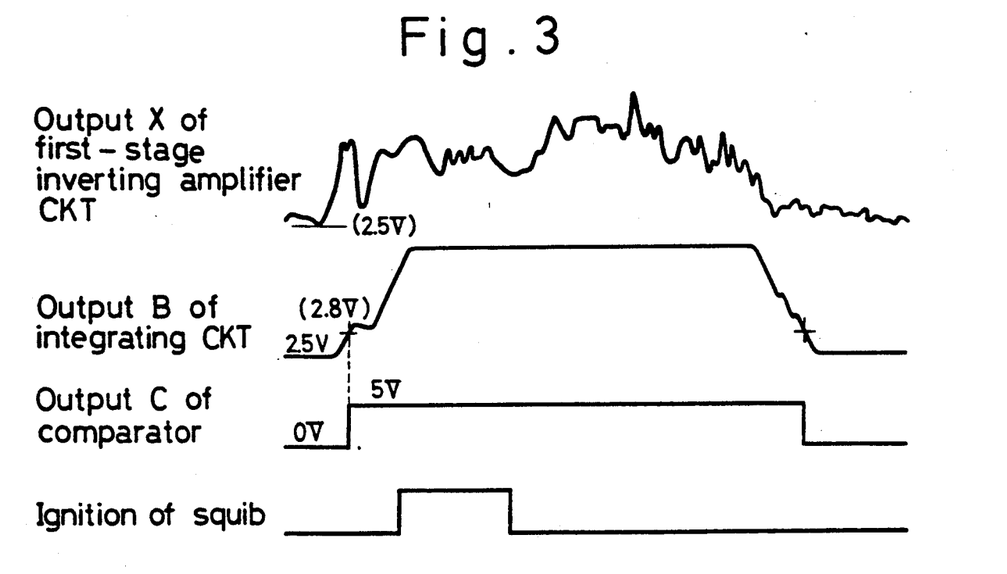
FIG. 3 is a time chart illustrative of the operations of the acceleration sensing circuit, the analog collision detection system and a drive circuit in a collision detection mode.

When a vehicle collision occurs, the first-stage inverting amplifier circuit of each of the acceleration sensing circuits 10a and 10b continuously outputs the voltage X higher than the 2.5 V, as shown in FIG. 3. The integrating circuit 40, 40' integrates the output A, A' (which is obtained by amplifying the output X in an inverting manner through the second-stage inverting amplifier circuit 15) in an inverting manner, so that the integral output B, B' of the integrating circuit 40, 40' exceeds the threshold voltage Vt (2.8 V). As a result, the output C, C' of the comparator 50, 50' is switched from the low level to the high level. The high-level outputs C, C' of the acceleration sensing circuits 10a and 10b are supplied as the collision detection signals to the NAND circuit 86 and the AND circuit 87, respectively.

The conditions of the vehicle collision for the analog collision detection systems 30a and 30b are determined to be less strict than the conditions of the vehicle collision for the digital collision detection system 70. Therefore, in the event of a vehicle collision, first, the high-level collision detection signals are fed respectively from the comparators 50 and 50, 50' to the NAND circuit 86 and the AND circuit 87. Thereafter, the microcomputer 71 feeds the low-level collision detection signal to the third transistor 84, and also feeds the high-level collision signals respectively to the NAND circuit 86 and the AND circuit 87. As a result, the third transistor 84 is turned on, and the output of the NAND circuit 86 goes to the low level, so that the first transistor 82 is turned on. Also, the output of the AND circuit 87 goes to the high level, so that the second transistor 83 is turned on. As a result, the ignition of the squib 1 is effected.

The microcomputer 71 can carry out the high-precision collision detection under the strict collision conditions. In the event of a run-away of the microcomputer 71, even if the collision detection signal is outputted from the microcomputer 71 before the microcomputer 71 is reset by a watchdog timer associated with the microcomputer 71, an accidental ignition of the squib 1 can be prevented, because the analog collision detection systems 30a and 30b do not output the respective collision detection signals so as not to turn on the transistors 82 and 83.

Next, the malfunction detection for the analog collision detection systems 30a and 30b, which is an important feature of the present invention, will now be described. First, this will be briefly explained with reference to FIG. 4. Immediately after a power-on resetting of the microcomputer 71, the output ports $O_3$ and $O_5$ go to the high level, and the other ports $O_1$, $O_2$, $O_4$, $O_6$ and $O_7$ go to the low level, as in the normal condition (in which the collision is not detected) of the collision detection mode. Since the output port $O_5$ is at the high level, the threshold voltage Vt for the comparator 50 is at the first voltage level (2.8 V). The integral output B is at the reference voltage Vr (2.5 V). Therefore, the output C of the comparator 50 is first at the low level.

Figure 4:
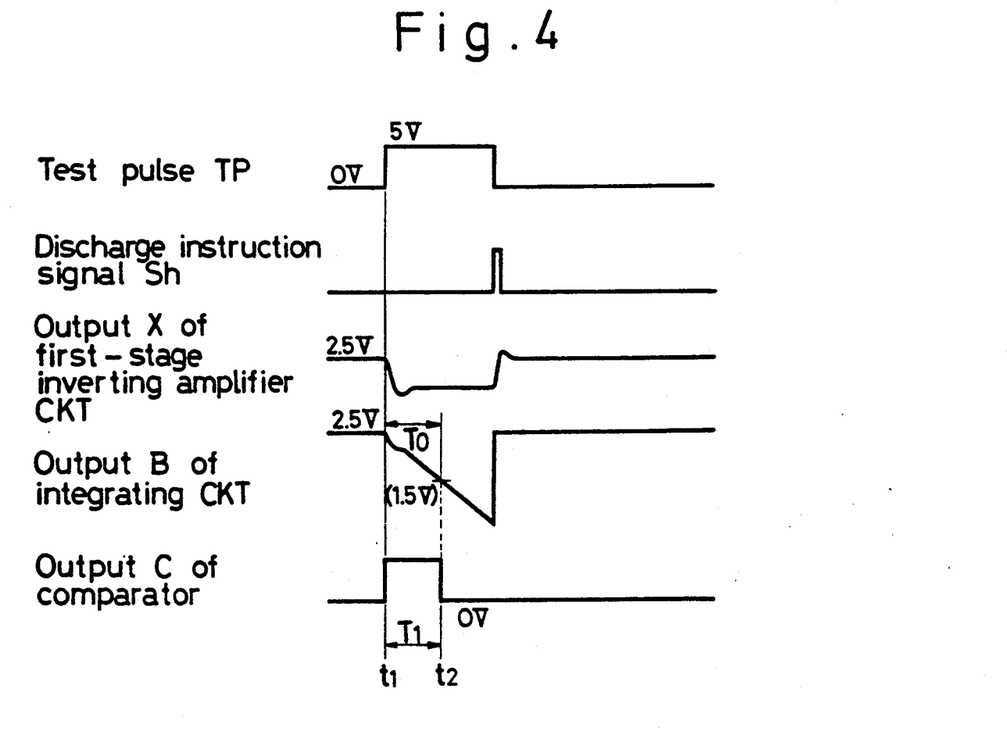
FIG. 4 is a time chart illustrative of the operations of the acceleration sensing circuit and the analog collision detection system in a malfunction detection mode.

A predetermined time period after the above setting of the voltage levels of the output ports, the microcomputer 71 executes the malfunction detection mode. More specifically, the output port $O_4$ begins to feed the high-level test pulses TP to the acceleration sensing circuits 10a and 10b, and in synchronism with this, the output port $O_5$ feeds the voltage level switch instruction signal Sw of a low level (0 V) to the level switching means 64 of the threshold voltage generating circuit 60.

In response to this switch instruction signal Sw, the level switching means 64 effects the switching operation. More specifically, in response to the switch instruction signal Sw, the diode 69 is turned off, and the diode 68 is turned on. As a result, the threshold voltage Vt goes to a level (hereinafter referred to as "second voltage level") obtained by dividing the constant voltage Vcc by the resistance value of the resistor 62 and the sum of the resistance values of the parallel-connected resistors 63 and 67. This second voltage level is lower not only than the first voltage level (2.8 V) but also than the reference voltage Vr (2.5 V), and the second voltage level is, for example, 1.5 V. Therefore, the comparator 50 compares the integral output B (2.5 V) with the above second voltage level (1.5 V), and the output C of the comparator 50 is switched from the low level to the high level. The leading edge of the output C is substantially in synchronism with the leading edge of the test pulse TP.

The test pulse TP is inputted to the buffer 13 of each of the acceleration sensing circuits 10a and 10b via the resistor 25, the diode 26 and the capacitor 21. Therefore, the output of the buffer 13 temporarily goes above 2.5 V, and the output X of the first-stage inverting amplifier circuit temporarily goes below 2.5 V, as shown in FIG. 4, and the output of the second-stage inverting amplifier circuit 17 (hence, the output A of the acceleration sensing circuit 10a, 10b) temporarily goes above 2.5 V. As a result, the output C of the integrating circuit 40 goes low from 2.5 V. When the integral output B goes below the second voltage level (1.5 V), the output C of the comparator 50 is switched to the low level.

If the analog collision detection systems 30a and 30b are normal, upon lapse of a predetermined time period $T_0$ from time $t_1$ of the leading edge of the test pulse TP, the integral output B reaches the second voltage level (1.5 V), and the output C of the comparator 50 falls.

Upon lapse of the predetermined time period $T_0$, the microcomputer 71 reads each integral output B in the form of digital data, and judges whether or not the integral output B is in an allowable range (for example, between 1.3 V and 1.7 V) around the second voltage level (1.5 V). If the integral output B is not in this allowable range, the microcomputer judges that either the integral circuit 40 or the acceleration sensing circuit 10a (10b) at the preceding stage thereof is subjected to a malfunction, and prohibits the outputting of the collision detection signals from the output ports $O_1$, $O_2$ and $O_3$, and also outputs the turn-on instruction signal Sk to turn on the alarm lamp 90. Also, when the voltage source for ADC 72 is abnormal, the integral output is not in the allowable range, and therefore this abnormality can also be detected.

When the actual time period $T_1$ from the above time $t_1$ to time $t_2$ when the output C of the comparator 50 falls is not in an allowable range around the above predetermined time period $T_0$, the microcomputer 71 judges that a malfunction exists, and prohibits the outputting of the collision detection signals, and turns on the alarm lamp 90 in the same manner as described above.

In the final stage of the malfunction detection mode, the microcomputer 71 outputs the discharge instruction signal Sh in synchronism with the trailing edge of the test pulse TP, so that the discharge switch 44 is turned on, thereby initializing the integrating circuit 40 so as to return the integral output B to the initial voltage level, that is, the reference voltage Vr.

Also, the discharge switch 44 is turned on by an associated circuit (not shown) at the time of the power-on resetting of the microcomputer 71, and is also turned on in response to a reset signal outputted from the watchdog timer when the microcomputer 71 runs away. Thus, at the time of the power-on and at the time of the run-away of the microcomputer 71, the analog collision detection systems 30a and 30b are prevented from outputting the respective collision detection signals. Also, when the deceleration condition of the vehicle is terminated with the integral value of the deceleration of the vehicle kept below a predetermined value, the microcomputer 71 detects this, and outputs the discharge instruction signal Sh to turn on the discharge switch 44. This prevents the outputting of the malfunction detection signals from the analog collision detection systems 30a and 30b which would otherwise be caused by the accumulation of the integral outputs due to the repetition of the above deceleration.

In the above malfunction detection mode, there are occasions when the third transistor 84 is in the ON state because of the run-away of the microcomputer 71 or of a malfunction of the third transistor 84. This will now be described. In this case, the voltage of the energy reservoir 81 is supplied to the resistors 66 and 67, so that the voltage at the junction point P increases. As a result, the threshold voltage Vt for the comparator 50 does not go to the second voltage level (1.5 V), but is maintained at the first voltage level (2.8 V). Therefore, the output C of the comparator 50 is maintained at the low level, and even if the collision detection signals are outputted respectively from the output ports $O_1$, $O_2$ and $O_3$, an accidental ignition of the squib 1 can be prevented.

The test pulse TP is inputted as a positive voltage signal to the buffer 13 of each of the acceleration sensing circuit 10a and 10b, and has a polarity opposite to that of the voltage signal which is supplied from the piezoelectric element 11 at the time of a vehicle collision. Therefore, the analog collision detection system 30a, 30b processes the test pulse TP as a signal representative of the acceleration of the vehicle, and therefore the integral output B, B' responsive to the test pulse TP becomes lower than the reference voltage Vr. Therefore, in the malfunction detection mode, even when the microcomputer 71 runs away with the test pulses kept outputted, an accidental ignition of the squib 1 can be prevented. The reason for this will now be described in detail. Because of the run-away of the microcomputer 71, it is not clear whether the threshold voltage Vt for the comparator 50 is at the first voltage level (2.8 V) or the second voltage level (1.5 V). Therefore, these two cases will be explained separately. When the threshold voltage Vr is at the first voltage level, this voltage level is higher than the integral output B (less than 2.5 V), so that the output C of the comparator 50 is maintained at the low level. Therefore, even if the microcomputer 71 runs away to produce the collision detection signal, the air bag is not operated. When the threshold voltage Vr is at the second voltage level (1.5 V), the output C of the comparator 50 temporarily goes to the high level, but is maintained at this high level only for a short time period. Therefore, in the event of the run-away of the microcomputer 71, there is a small possibility that the microcomputer 71 outputs the collision detection signal during the time when the output of the comparator 50 is at the high level, thus greatly reducing the possibility of operating the air bag.

Figure 5:
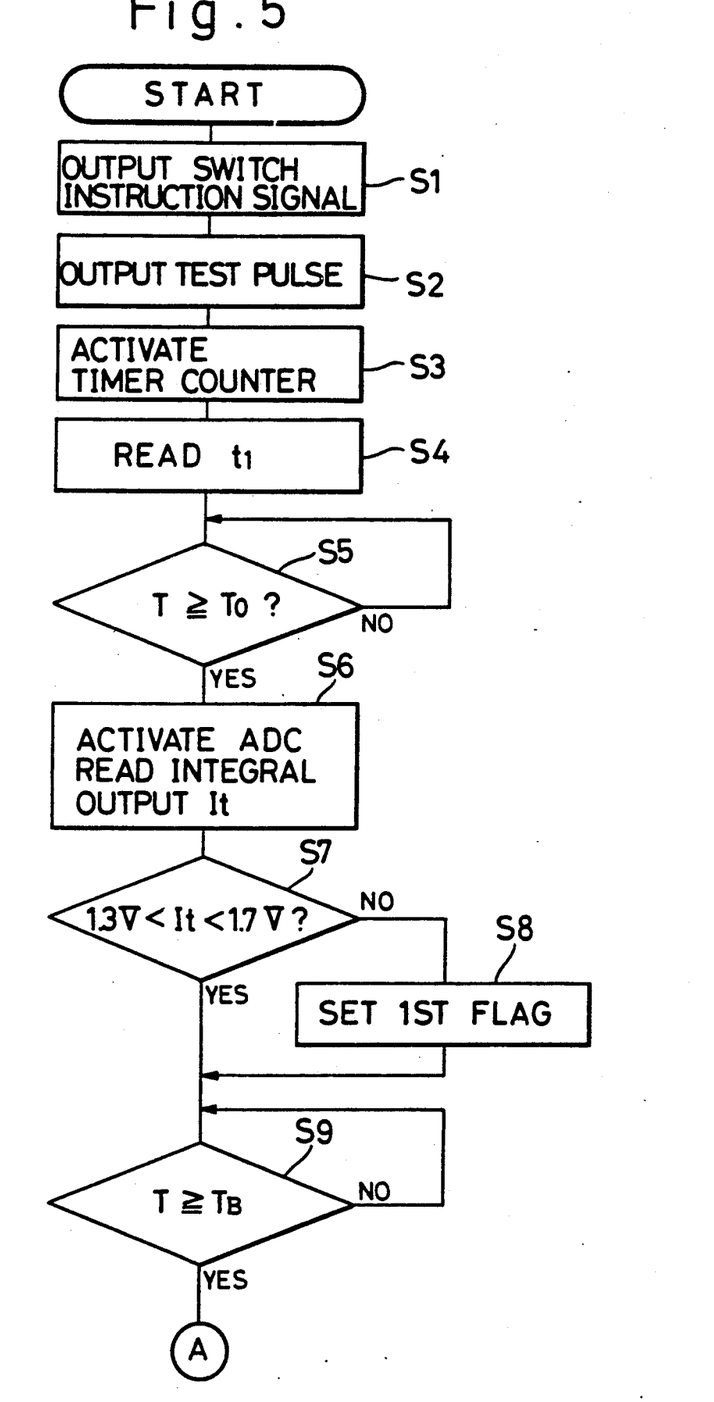
FIGS. 5 and 6 are a flow chart of a routine executed by a microcomputer.
Figure 6:
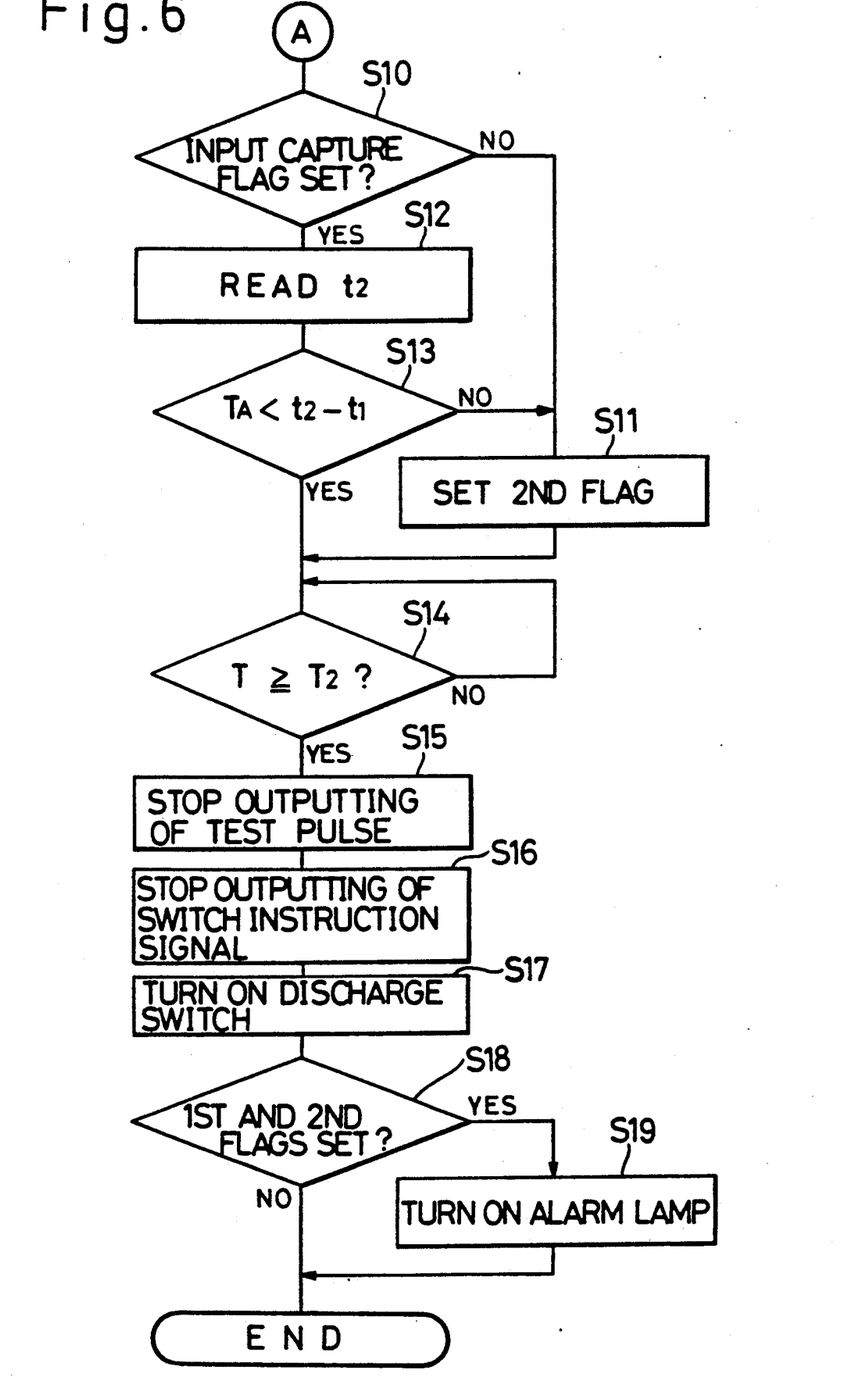

Next, the routine of the malfunction detection mode to be executed by the microcomputer 71 will now be described in detail with reference to FIGS. 5 and 6. Two pairs of first and second malfunctions flags (later described) are provided respectively for the two analog collision detection systems 30a and 30b. After the above setting of the voltage levels of the output ports, the outputting of the switch instruction signal Sw to the level switching means 64 of the threshold voltage generating circuit 60 is started (Step S1), and the outputting of the test pulses TP to each of the acceleration sensing circuits 10a and 10b is started (Step S2), and a timer counter T is activated (Step S3). Therefore, the time of start of the outputting of the switch instruction signal Sw coincides with the time of start of the outputting of the test pulse TP, and the timer counter T begins to count time from the time of start of the outputting of the test pulse.

Next, the values of registers of the input captures $IC_1$ and $IC_2$ are read, and are written onto a RAM (Step S4). The input captures $IC_1$ and $IC_2$ receive the outputs of the comparators 50 and 50' of the analog collision detection systems 30a and 30b, respectively, and write, onto their respective registers, the values $t_1$ of free-running counters obtained at the time of the leading edges of the outputs of the comparators 50 and 50'. As described above, the output of the comparator 50 rises in synchronism with the leading edge of the test pulse, and therefore the above value $t_1$ represents the time of the leading edge of the test pulse.

Next, it is judged whether or not the count of the timer counter T is equal to or greater than the predetermined time period $T_0$ (Step S5). As described above, the time period $T_0$ is a time period from the time of start of the outputting of the test pulse to the time of reaching of the integral output B to the second voltage level (1.5 V) of the threshold voltage Vt when the integral circuit 40, 40' and the acceleration sensing circuit 10a, 10b at the preceding stage thereof are normal. When the count of the timer counter T is equal to or greater than the predetermined time period $T_0$, ADC 72 is operated to output digital data It, respectively representing the two integral outputs B, B', to the microcomputer 71. Then, it is judged whether or not each of these digital data It is in the allowable range of between 1.3 V and 1.7 V. If the result is "NO", the corresponding first flag is set (Step S8).

Then, it is judged whether or not the count of the timer counter T is equal to or greater than a predetermined time period $T_B$ (Step S9). The time period $T_B$ is the upper limit of the allowable range of a time period from the time of start of the outputting of the test pulse to the time of the trailing edge of the output of the comparator 50, 50'. When the count of the timer counter T is equal to or greater than the predetermined time period $T_B$, it is judged whether or not each of input capture flags is set (Step S10). The input capture flag is set in response to the leading edge and trailing edge of the output of the comparator 50, 50' fed to the input capture. This flag is set in response to the first leading edge, but is cleared at Step S4 in which the above values $t_1$ are read. Therefore, the setting of this flag represents the fact that the output of the comparator 50, 50' has fallen. In the above Step S10, if it is judged that the input capture flag is not set (that is, the output of the comparator 50 does not fall upon lapse of the predetermined time period $T_B$), the corresponding second flag is set (Step S11).

In the above Step S10, if it is judged that the input capture flag is set, the value $t_2$ of the register of the input capture is read and written onto the RAM (Step S12). The value $t_2$ represents the time of the trailing edge of the output of the comparator 50, 50'.

Next, the time period $t_2 - t_1$ (i.e., $T_1$ in FIG. 5) from the time of the leading edge of the test pulse to the time of the trailing edge of the output of each comparator 50, 50' is calculated, and it is judged whether or not each of the time periods $T_1$ is longer than a predetermined time period $T_A$ (Step S13). The time period $T_A$ is the lower limit of the allowable range of a time period from the time of the outputting of the test pulse to the time of the trailing edge of the output of the comparator 50, 50'. If the result is "NO" in Step S13, the corresponding second flag is set (Step S 11).

As is clear from the above description, in Steps S9 to S 13, it is checked whether or not the output of the comparator 50 falls in the allowable range ($T_A$ to $T_B$) of the time period from the time of start of the outputting of the test pulse.

After Step S11 or Step S13, it is judged whether or not the count of the timer counter T is equal to or greater than a predetermined time period $T_2$ (Step S14). The time period $T_2$ is longer than the time period $T_B$. If the count of the timer counter T is equal to or greater than the predetermined time period $T_2$, the outputting of the test pulse is stopped (Step S15), and the outputting of the switch instruction signal is stopped (Step S16), and the discharge switch 44 is turned on (Step S17).

Next, it is judged whether or not the first and second flags are set (Step S18), and if one of them is set, the alarm lamp 90 is turned on, and also the outputting of the malfunction detection signal is prohibited (Step S19).

When a repair of the control system is to be made after the detection of the malfunction, the malfunction portion can be specified by the set conditions of the two first flags and two second flags stored in the RAM. This much facilitates the repair.

To summarize the operation of the malfunction detection, since a malfunction of the analog collision detection systems 30a and 30b is detected by the microcomputer 71, the reliability of the analog collision detection systems 30a and 30b can be improved, and an accidental operation of the air bag due to a run-away of the microcomputer 71 can be positively prevented. And besides, in the event of a vehicle collision, the air bag can be expanded without fail. Further, the test pulse is fed from the microcomputer 71 to the acceleration sensing circuits 10a and 10b so as to check the outputs of the integrating circuits 40 and 40' and comparators 50 and 50', and therefore the above malfunction detection can be carried out only with the addition of a simple circuit or wiring.

The present invention is not to be restricted to the above embodiment, and various modifications can be made. For example, the digital collision detection system and the analog collision detection system may respectively receive outputs of acceleration sensing circuits independent of each other. In this case, it will be appreciated that the microcomputer outputs the test pulse to the acceleration sensing circuit associated with the analog collision detection system.

The voltage level switch instruction signal Sw fed from the microcomputer 71 may be outputted before the outputting of the test pulse is started. Also, this signal Sw may be outputted after the lapse of a time period sufficiently shorter than the above time period $T_0$.

An example of vehicle safety device, other than the air bag, in which the control system of the present invention is to be incorporated is a seat belt device.

What is claimed is:

1. A control system for a vehicle safety device, comprising:
   (a) an acceleration sensing circuit which produces an output;
   (b) an analog collision detection system including an integrating circuit for integrating the output of said acceleration sensing circuit, and a comparator circuit for comparing an output of said integrating circuit with a threshold level so as to detect a collision of a vehicle;
   (c) a digital collision detection system including an analog-to-digital converter for converting the output of said acceleration sensing circuit into digital data, and a microcomputer, said microcomputer comprising (i) collision detection means for performing calculations in accordance with said digital data from said analog-to-digital converter, so as to detect the vehicle collision; (ii) test pulse generating means for outputting test pulses to said acceleration sensing circuit; and (iii) malfunction detection means for checking at least one of the output of said integrating circuit of said analog collision detection system and an output of said comparator circuit so as to detect a malfunction of said analog collision detection system, the outputs of said integrating circuit and said comparator circuit being produced in response to said test pulse; and
   (d) a drive circuit which operates said vehicle safety device when said drive circuit simultaneously receives collision detections signals respectively from both of said analog and digital collision detection systems;
   wherein the output of said acceleration sensing circuit produced in response to said test pulse has a polarity opposite to that of the output of said acceleration sensing circuit produced during vehicle collision with respect to a reference voltage; and
   wherein the outputs of said acceleration sensing circuit and said integrating circuit are maintained at the reference voltage when the vehicle is stopped or is running at a constant speed, and the output of said integrating circuit produced in response to said test pulse has a polarity opposite to that of the output of said integrating circuit produced during vehicle collision with respect to the reference voltage.

2. A control system according to claim 1, further comprising an alarm device, said microcomputer outputting a malfunction detection signal to said alarm device when said malfunction detection means detects a malfunction of said analog collision detection system, thereby operating said alarm device.

3. A control system according to claim 1, in which said microcomputer judges whether or not the output of said integrating circuit, produced a predetermined time period after the outputting of said test pulse is started, is within an allowable range, and if the result of this judgment is in the negative, the microcomputer judges that there exists the malfunction.

4. A control system according to claim 1, in which the microcomputer judges whether or not a time period from the time of start of the outputting of said test pulse to the time of switching of the output level of said comparator circuit is within an allowable range, and if the result of this judgment is in the negative, the microcomputer judges that there exists the malfunction.

5. A control system according to claim 1, in which said acceleration sensing circuit comprises an acceleration sensor for producing an output of a negative voltage at the time of the vehicle collision, and test pulse input means connected in parallel with said acceleration sensor, said microcomputer feeding said test pulse of a positive voltage to said test pulse input means.

6. A control system for a vehicle safety device, comprising:
   (a) an acceleration sensing circuit which produces an output;
   (b) an analog collision detection system including an integrating circuit for integrating the output of said acceleration sensing circuit, and a comparator circuit for comparing an output of said integrating circuit with a threshold level so as to detect a collision of a vehicle;
   (c) a digital collision detection system including an analog-to-digital converter for converting the output of said acceleration sensing circuit into digital data, and a microcomputer, said microcomputer comprising (i) collision detection means for performing calculations in accordance with said digital data from said analog-to-digital converter, so as to detect the vehicle collision; (ii) test pulse generating means for outputting test pulses to said acceleration sensing circuit; and (iii) malfunction detection means for checking at least one of the output of said integrating circuit of said analog collision detection system and an output of said comparator circuit so as to detect a malfunction of said analog collision detection system, the outputs of said integrating circuit and said comparator circuit being produced in response to said test pulse; and (d) a drive circuit which operates said vehicle safety device when said drive circuit simultaneously receives collision detections signals respectively from both of said analog and digital collision detection systems;

wherein the output of said acceleration sensing circuit produced in response to said test pulse has a polarity opposite to that of the output of said acceleration sensing circuit produced during vehicle collision with respect to a reference voltage;

wherein said acceleration sensing circuit comprises an acceleration sensor for producing an output of a negative voltage at the time of the vehicle collision, and test pulse input means connected in parallel with said acceleration sensor, said microcomputer feeding said test pulse of a positive voltage to said test pulse input means; and wherein said acceleration sensing circuit further comprises a buffer, and a reference voltage source for supplying the reference voltage of a positive value to an input terminal of said buffer, said acceleration sensor and said test pulse input means being connected to the input terminal of said buffer.

7. A control system for a vehicle safety device, comprising:

(a) an acceleration sensing circuit which produces an output;

(b) an analog collision detection system including an integrating circuit for integrating the output of said acceleration sensing circuit, and a comparator circuit for comparing an output of said integrating circuit with a threshold level so as to detect a collision of a vehicle;

(c) a digital collision detection system including an analog-to-digital converter for converting the output of said acceleration sensing circuit into digital data, and a microcomputer, said microcomputer comprising (i) collision detection means for performing calculations in accordance with said digital data from said analog-to-digital converter, so as to detect the vehicle collision; (ii) test pulse generating means for outputting test pulses to said acceleration sensing circuit; and (iii) malfunction detection means for checking at least one of the output of said integrating circuit of said analog collision detection system and an output of said comparator circuit so as to detect a malfunction of said analog collision detection system, the outputs of said integrating circuit and said comparator circuit being produced in response to said test pulse;

(d) a drive circuit which operates said vehicle safety device when said drive circuit simultaneously receives collision detections signals respectively from both of said analog and digital collisions detection systems, wherein the output of said acceleration sensing circuit produced in response to said test pulse has a polarity opposite to that of the output of said acceleration sensing circuit produced during vehicle collision with respect to a reference voltage; and a threshold voltage generating circuit for supplying a threshold voltage of a first voltage level to said comparator circuit of said analog collision detection system, and voltage level switching means responsive to a switch instruction signal from said microcomputer so as to forcibly switch said threshold voltage to a second voltage level, the output of said integrating circuit being maintained at the reference voltage level when the vehicle is stopped or is running at a constant speed, said reference voltage level being between said first voltage level and said second voltage level of said threshold voltage; at the time of the vehicle collision in a collision detection mode, the output of said integrating circuit going toward said first voltage level, and when the output of said integrating circuit reaches said first voltage level, the output of said comparator circuit being switched from a first logic level to a second logic level so as to serve as said collision detection signal; in a malfunction detection mode, said microcomputer outputting said switch instruction signal to said voltage level switching means, so that said threshold voltage is switched to said second voltage level; in the vicinity of the time of switching of said threshold level to said second voltage level, said test pulse being fed from said microcomputer to said acceleration sensing circuit, so that the output of said integrating circuit goes to said second voltage level; and when the output of said integrating circuit reaches said second voltage level, the output of said comparator circuit being switched from said second logic level to said first logic level.

8. A control system according to claim 7, in which said voltage level switching means comprises first, second and third diodes whose cathodes are connected together, and a resistor connected between a junction point of said three diodes and the ground, said drive circuit including a transistor which is turned on in response to a collision detection signal from said microcomputer, an anode of said first diode being connected to said microcomputer so as to receive said switch instruction signal of a low level from said microcomputer, an anode of said second diode being connected between said transistor and said vehicle safety device, and an anode of said third diode being connected to one input terminal of said comparator circuit which receives said threshold voltage.

* * * * *